US009800704B2

(12) United States Patent
Dong

(10) Patent No.: US 9,800,704 B2
(45) Date of Patent: Oct. 24, 2017

(54) CALL CONTROL METHOD AND TERMINAL

(71) Applicant: ZTE CORPORATION, Shenzhen, Guangdong Province (CN)

(72) Inventor: Deliang Dong, Shenzhen (CN)

(73) Assignee: XI'AN ZHONGXING NEW SOFTWARE CO., LTD. (CN)

( * ) Notice: Subject to any disclaimer, the term of this patent is extended or adjusted under 35 U.S.C. 154(b) by 0 days.

(21) Appl. No.: 15/110,153

(22) PCT Filed: Jun. 4, 2014

(86) PCT No.: PCT/CN2014/079170
§ 371 (c)(1),
(2) Date: Jul. 7, 2016

(87) PCT Pub. No.: WO2015/103841
PCT Pub. Date: Jul. 16, 2015

(65) Prior Publication Data
US 2016/0330306 A1    Nov. 10, 2016

(30) Foreign Application Priority Data

Jan. 7, 2014  (CN) .......................... 2014 1 0007069

(51) Int. Cl.
*H04W 4/00*     (2009.01)
*H04M 1/60*     (2006.01)
(Continued)

(52) U.S. Cl.
CPC ............ *H04M 1/6066* (2013.01); *H04B 5/00* (2013.01); *H04M 1/7253* (2013.01);
(Continued)

(58) Field of Classification Search
CPC .... H04B 5/00; H04M 1/6066; H04M 1/7253; H04W 76/023; H04W 4/008
See application file for complete search history.

(56) References Cited

U.S. PATENT DOCUMENTS

2003/0045235 A1* 3/2003 Mooney ............ H04M 1/6066
                                                455/41.1
2005/0186936 A1   8/2005 Shih
2007/0202929 A1* 8/2007 Satake ............... H04M 1/6066
                                                455/569.1

FOREIGN PATENT DOCUMENTS

CN      101309318 A     11/2008
CN      202135194 U     2/2012
EP      1761004 A2      3/2007

OTHER PUBLICATIONS

European Search Report issued Nov. 4, 2016 for EP Application No. 14877678.4.
(Continued)

*Primary Examiner* — Ping Hsieh
(74) *Attorney, Agent, or Firm* — Plumsea Law Group, LLC

(57) ABSTRACT

A Bluetooth-related call control method for mobile phones and a mobile terminal relate to the technical field of mobile communication terminals and Bluetooth. The terminal disclosed in the present document includes: a Bluetooth connection detection module, configured to detect a Bluetooth connection state between a headset and the terminal, and when the Bluetooth connection state between the headset and the terminal is a disconnected state and in a current call state a call is present, transmit a prompt tone play command to a play module; and the play module, configured to read and play externally a first preset audio file according to the prompt tone play command transmitted by the Bluetooth connection detection module, herein the first preset audio file stores a prompt tone indicating that the Bluetooth headset has been disconnected.

12 Claims, 2 Drawing Sheets

(51) Int. Cl.
*H04B 5/00* (2006.01)
*H04M 1/725* (2006.01)
*H04W 76/02* (2009.01)

(52) U.S. Cl.
CPC ......... *H04W 4/008* (2013.01); *H04W 76/023* (2013.01); *H04M 2250/02* (2013.01)

(56) References Cited

OTHER PUBLICATIONS

International Search Report dated Sep. 29, 2014 in PCT Patent Application No. PCT/CN2014/079170.

\* cited by examiner

CALL CONTROL METHOD AND TERMINAL

CROSS-REFERENCE TO RELATED APPLICATION(S)

This application is the U.S. National Phase application of PCT application number PCT/CN2014/079170 having a PCT filing date of Jun. 4, 2014, which claims priority of Chinese patent application 201410007069.7 filed on Jan. 7, 2014, the disclosures of which are hereby incorporated by reference.

TECHNICAL FIELD

The present document relates to the technical field of Bluetooth-related call control for mobile phones, and in particular, to a Bluetooth-related call control method for mobile phones and a mobile terminal.

BACKGROUND OF RELATED ART

Bluetooth technology, as a kind of short-range wireless communication technology, has been applied universally and extensively. Bluetooth headsets, as one of the applications of the Bluetooth technology, provide great convenience to people. Especially for drivers, use of a Bluetooth headset in the driving to make a call or answer a call is not only very convenient, but also has very important significance for safe driving. In addition, use of a Bluetooth headset in the home or office to listen to music not only avoids the interference with others, but also avoids troubles of wire wrapping like a wired headset.

After a Bluetooth headset is connected to a mobile phone terminal, a user may use the Bluetooth headset to listen to music or make a call. However, due to some unexpected factors (for example power-off of the headset, a distance between the headset and the mobile phone exceeds a limit), a disconnection between the Bluetooth headset and the mobile phone will be resulted in. In this case, if the user is listening to music, the mobile phone will pause playing the music, which can bring a good user experience. But if the mobile phone is in a call, currently there is no effective process for such situation. There may be a case that a user says a few words and then finds a malfunction condition only after there is no response from the opposing side. Further, some troubles are also made to the opposing side of the call since the opposing side does not know what happens, and in a period there is no voice, which results in bad experience.

SUMMARY

The technical problem to be solved by the embodiments of the present document is to provide a call control method and a terminal, to solve the problem in the process of a call that the terminal is disconnected from a Bluetooth headset.

In order to solve the above technical problem, the following technical solutions are used.

The embodiments of the present document disclose a terminal, at least including a Bluetooth connection detection module, a call module and a play module, herein, the Bluetooth connection detection module detects a Bluetooth connection state between a Bluetooth headset and the terminal, queries a current call state from the call module when detecting that the Bluetooth connection state between the Bluetooth headset and the terminal is a disconnected state, and transmits a prompt tone play command to the play module when the Bluetooth connection state between the Bluetooth headset and the terminal is a disconnected state and the current call state is that a call is present;

the call module feeds back the current call state to the Bluetooth connection detection module; and the play module reads a first preset audio file and plays externally the first preset audio file according to the prompt tone play command transmitted by the Bluetooth connection detection module, herein the first preset audio file stores a prompt tone indicating that the Bluetooth headset has been disconnected.

Alternatively, in the above terminal, the play module further reads a second preset audio file and transmits the second preset audio file to the opposing side of the call via a voice channel when receiving the prompt tone play command transmitted by the Bluetooth connection detection module, herein the second preset audio file is an audio file indicating that the Bluetooth headset has been disconnected.

Alternatively, in the above terminal, the play module reads the second preset audio file from a physical storage space of the terminal, outputs a corresponding byte stream in the second preset audio file encoded by a codec to the voice channel of the call module, and transmits the byte stream to the opposing side of the call via a wireless air interface.

Alternatively, in the above terminal, the play module reads the first preset audio file from the physical storage space of the terminal, and controls the first preset audio file encoded by a codec to be externally played by a speaker.

Alternatively, in the above terminal, the Bluetooth connection detection module registers monitoring on a Bluetooth module of the mobile phone to detect the Bluetooth connection state between the Bluetooth headset and the terminal.

The embodiments of the present document further disclose a call control method, including:

detecting, by a terminal, a Bluetooth connection state between a Bluetooth headset and the terminal, and when detecting that the Bluetooth connection state between the Bluetooth headset and the terminal is a disconnected state and the terminal determines that a call is currently present, playing externally, by the terminal, a first preset audio file, herein the first preset audio file stores a prompt tone indicating that the Bluetooth headset has been disconnected.

Alternatively, in the above method, when detecting that the Bluetooth connection state between the Bluetooth headset and the terminal is a disconnected state and the terminal determines that a call is currently present, the method further includes:

transmitting, by the terminal, a second preset audio file to the opposing side of the call via a voice channel, herein the second preset audio file is an audio file indicating that the Bluetooth headset has been disconnected.

Alternatively, in the above method, the process of transmitting, by the terminal, a second preset audio file to the opposing side of the call via a voice channel includes:

reading, by the terminal, the second preset audio file from a physical storage space of the terminal, outputting a corresponding byte stream in the second preset audio file encoded by a codec to the voice channel of a call module, and transmitting the byte stream to the opposing side of the call via a wireless air interface.

Alternatively, in the above method, the process of playing externally, by the terminal, a first preset audio file includes:

reading, by the terminal, the first preset audio file from a physical storage space of the terminal, and playing externally the first preset audio file encoded by a codec through a speaker.

Alternatively, in the above method, the terminal registers monitoring on a Bluetooth module of the mobile phone to detect the Bluetooth connection state between the Bluetooth headset and the terminal.

With the technical solutions of the present application, the user is prompted when the terminal is disconnected from the Bluetooth headset in the process of a call, which is beneficial to the opposing side of the call to know the current condition in this way, thereby greatly improving user experience.

PREFERRED EMBODIMENTS OF THE INVENTION

The technical solutions according to the embodiments of the present document will be further described in detail below in conjunction with accompanying drawings. It should be illustrated that without any conflict, the embodiments of the present application and the features in the embodiments can be randomly combined with each other.

Embodiment One

In the embodiment of the present document, a Bluetooth connection state between a headset and a mobile phone may be detected during a call, and when a disconnection is detected, a user and the opposing side of the call may be prompted that the Bluetooth headset has been disconnected.

Figure 1:
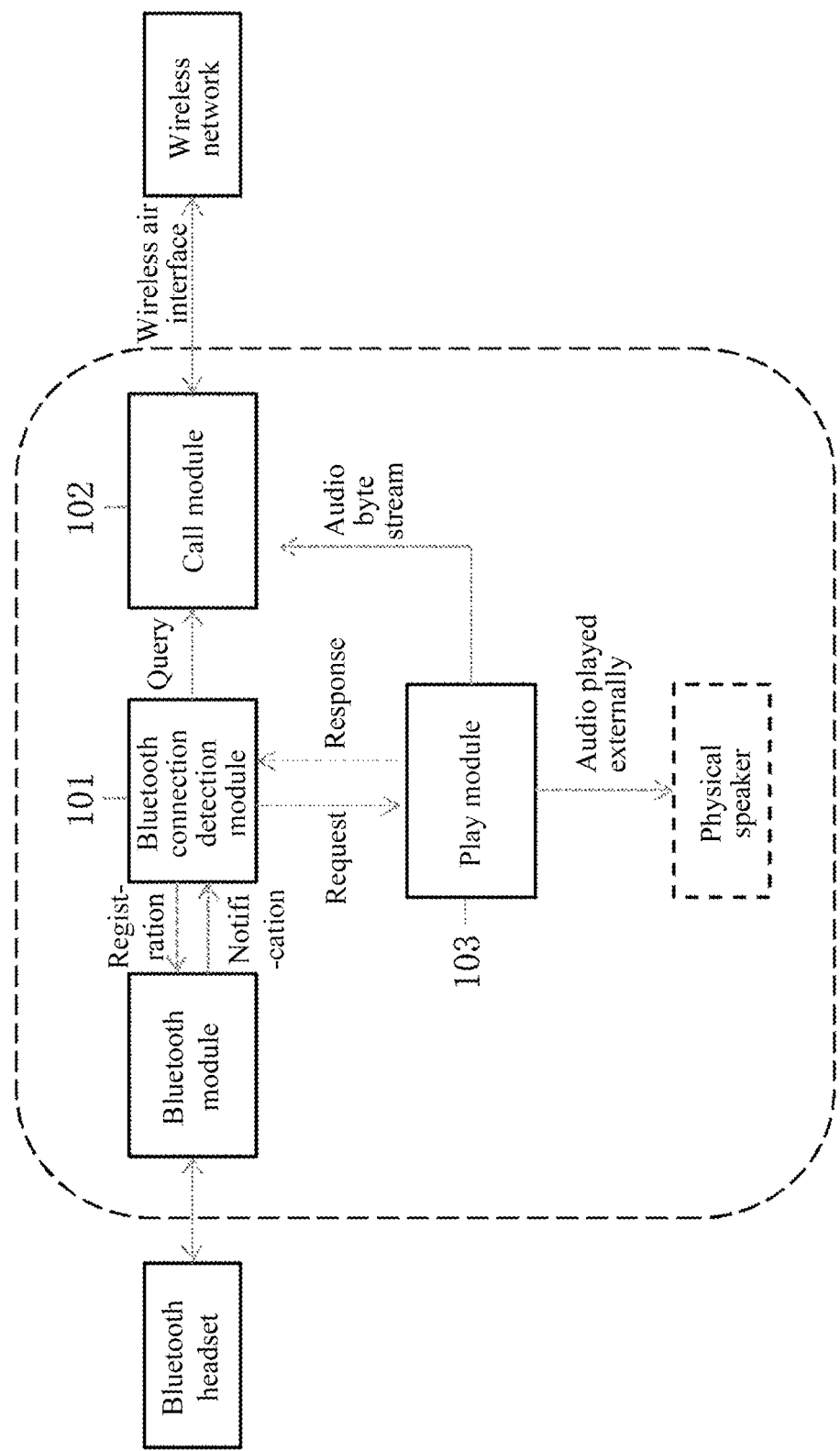
FIG. 1 is a structural diagram of a terminal according to an embodiment.

The present embodiment provides a terminal, as shown in FIG. 1, including at least a Bluetooth connection detection module 101, a call module 102 and a play module 103.

The Bluetooth connection detection module 101 is configured to detect a Bluetooth connection state between a headset and the terminal, query a current call state from the call module if a disconnection has been detected, and transmit a prompt tone play command to the play module if a call is present.

Herein, the Bluetooth connection detection module 101 interacts with a Bluetooth module related to the mobile phone via an interface (as shown in FIG. 1). The interaction manner is that the Bluetooth connection detection module registers monitoring on the Bluetooth module, and after the registration is successful, the Bluetooth module feeds back a Bluetooth disconnection state to the Bluetooth connection detection module in real time. The Bluetooth connection detection module may query information of a current call state from the call module via an active query interface. The play module accepts a command from the Bluetooth connection detection module. The play module and the Bluetooth connection detection module issue a command and return a result in a Request-Response manner.

The call module 102 is configured to feed back the current call state to the Bluetooth connection detection module.

Herein, the above call module 102 further interacts with a wireless network side, and manages a call session of the terminal, including establishment and release of an air interface link, open and close of a voice channel, provision of a query for a call state to other modules of the mobile phone.

The play module 103 is configured to read the first preset audio file and play externally the first preset audio file according to the prompt tone play command transmitted by the Bluetooth connection detection module 101. Herein the first preset audio file stores a prompt tone indicating that the Bluetooth headset has been disconnected.

It can be seen that the above play module 103 externally plays the first preset audio file, which is primarily used to prompt the user that the Bluetooth headset used in the current call has been disconnected from the mobile phone, so that the user implements subsequent operations.

On the basis of the above terminal, alternatively, when the play module 103 receives the prompt tone play command transmitted by the Bluetooth connection detection module 101, the play module 103 may further read the second preset audio file and transmit the second preset audio file to the opposing side of the call via the voice channel, herein the second preset audio file is an audio file indicating that the Bluetooth headset has been disconnected. That is, the play module 103 may further transmit a prompt tone indicating that the Bluetooth headset has been disconnected from the terminal to the opposing side of the call, to prompt the opposing side that the call may be influenced.

Specifically, the Bluetooth connection detection module 101 calls an active query interface to acquire the current call state once receiving a notification of the disconnection from the Bluetooth module. If there is a call, the Bluetooth connection detection module 101 issues a Request (i.e., a prompt voice play command) to the play module 103. The play module 103 transmits a Response to the Bluetooth detection module after receiving the command. Then, the play module 103 reads a preset file 1, and externally plays the preset file 1 to prompt the user through a speaker after the preset file 1 is encoded and decoded by a codec. At the same time, a preset audio file 2 is read from a physical storage space of the mobile phone, the preset audio file 2 is encoded by a codec and then a corresponding byte stream is output to the voice channel of the call module 102, and then the byte stream is transmitted to the opposing side of the call via a wireless air interface.

Figure 2:
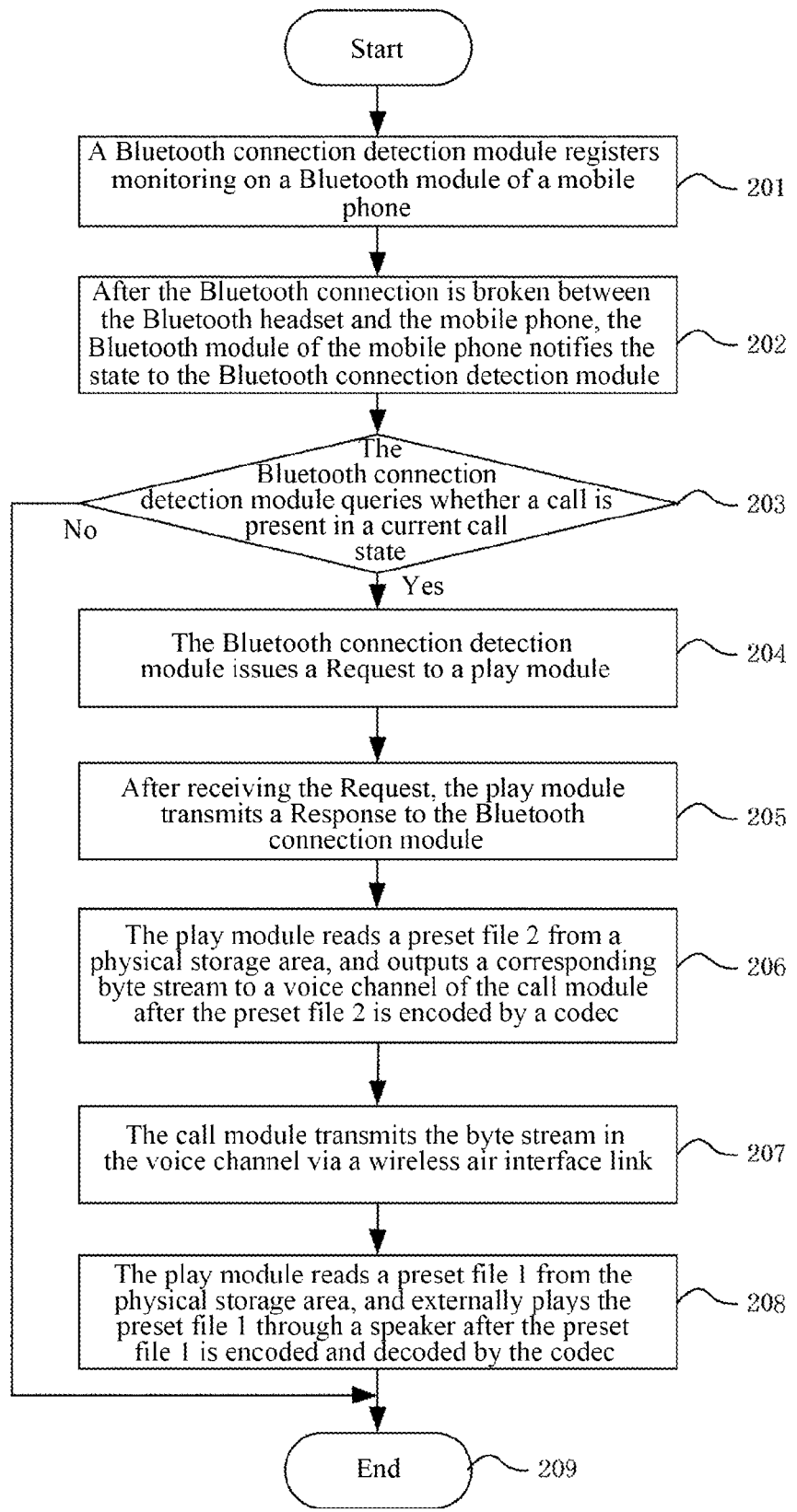
FIG. 2 is a flowchart of the terminal illustrated in FIG. 1 implementing call control.

A specific implementation of the above process is shown in FIG. 2, and includes the following steps.

In step 201, a Bluetooth connection detection module registers monitoring on a Bluetooth module of a mobile phone.

In step 202, after the Bluetooth connection is broken between the Bluetooth headset and the mobile phone, the Bluetooth module of the mobile phone notifies the state to the Bluetooth connection detection module.

In step 203, the Bluetooth connection detection module queries a current call state, and if there is no call, the process turns to step S209, and if there is a call, the process turns to step 204.

In step 204, the Bluetooth connection detection module issues a Request to a occurrence of such case, and externally plays the first preset audio file through a speaker to the play module.

In step 205, after receiving the Request, the play module transmits a Response to the Bluetooth connection module.

In step 206, the play module reads a preset file 2 (i.e., the second preset audio file) from a physical storage area, and outputs a corresponding byte stream to a voice channel of the call module after the preset file 2 is encoded by a codec.

In step 207, the call module transmits the byte stream in the voice channel via a wireless air interface link.

In step 208, the play module reads a preset file 1 (i.e., the first preset audio file) from the physical storage area, and externally plays the preset file 1 through a speaker after the preset file 1 is encoded and decoded by the codec.

In step 209, the process ends.

Embodiment two

The present embodiment provides a call control method. With this method, mainly in a case that a user is using a terminal to make a call through a Bluetooth headset, after there is a Bluetooth disconnection between the Bluetooth headset and the mobile phone due to some unexpected factors (for example power-off of the headset due to no power, a distance between the headset and the mobile phone exceeds a limit or the like), the terminal can detect occurrence of such case, and externally plays the first preset audio file through a speaker to the user, i.e., a prompt tone, "please note that the Bluetooth headset has been disconnected". Alternatively, the second preset audio file may also be played to the opposing side of the call via a voice channel of the wireless network, herein the second preset audio file may have content of "the Bluetooth headset of the opposing side has been disconnected, please wait".

A call control method according to the present embodiment includes:

a terminal detects a Bluetooth connection state between a headset and the terminal, and when detecting that the Bluetooth connection state between the headset and the terminal is a disconnected state and the terminal determines that a call is currently present, the terminal plays externally the first preset audio file, herein the first preset audio file stores a prompt tone indicating that the Bluetooth headset has been disconnected.

Herein, the terminal may register monitoring on a Bluetooth module of the mobile phone to detect the Bluetooth connection state between the headset and the terminal.

The process of playing externally, by the terminal, the first preset audio file includes: the terminal reads the first preset audio file from a physical storage space of the terminal, and plays externally the first preset audio file encoded by a codec through a speaker.

Further, alternatively, when it is detected that the Bluetooth connection state between the headset and the terminal is disconnected and the terminal determines that a call is currently present, the second preset audio file is further transmitted to the opposing side of the call via a voice channel, to prompt the opposing side of the call that "the Bluetooth headset has been disconnected". At this time, a file byte stream is read from a physical storage space of the mobile phone, and then is processed by a codec of the mobile phone. The solution relates to two preset audio files, herein, the first preset audio file is an audio file which is used to prompt the user that the Bluetooth connection of his/her own has been disconnected, and this file is processed by the codec and then is directly played by an externally-connected speaker; and the second preset audio file is played to the opposing side of the call, and the file is processed by the codec and then the encoded byte stream is transmitted to the voice channel.

It can be seen from the above embodiments that with the technical solutions of the present application, after the terminal is disconnected from the Bluetooth headset, the terminal automatically externally plays a prompt voice such as "please note that the Bluetooth headset has been disconnected" or the like to the user through a speaker to prompt the user, and at the same time plays a preset record file (the record file may have content of "the Bluetooth headset of the opposing side has been disconnected, please wait") to the opposing side via the voice channel of the wireless network to prompt the opposing side to wait for a moment. This not only prompts the user himself/herself, but also is beneficial to the opposing side of the call to know the current condition, thereby largely improving user experience.

One ordinary skilled in the art can understand that all or a part of steps in the above method can be implemented by programs instructing related hardware, and the programs can be stored in a computer readable storage medium, such as a read-only memory, a disk or a CD-ROM, etc. Alternatively, all or a part of steps in the above embodiments can also be implemented by one or more integrated circuits. Accordingly, one or more modules/units in the above embodiments can be implemented in the form of hardware, or can also be implemented in the form of software functional module. The present application is not limited to any particular form of a combination of hardware and software.

The above description is only the preferable embodiments of the present document, which is not used to limit the present document. All the modifications, equivalent substitutions, and improvements, etc. made within the essence and principle of the present document shall fall into the protection scope of the present document.

INDUSTRIAL APPLICABILITY

With the technical solutions of the present application, the user is prompted when the terminal is disconnected from the Bluetooth headset in the process of a call, which is beneficial to the opposing side of the call to know the current condition in this way, thereby greatly improving user experience. Therefore, the present document has strong industrial applicability.

What is claimed is:

1. A terminal, comprising a Bluetooth connection detection module, a call module and a play module, wherein, the Bluetooth connection detection module is configured to detect a Bluetooth connection state between a Bluetooth headset and the terminal, query a current call state from the call module when detecting that the Bluetooth connection state between the Bluetooth headset and the terminal is a disconnected state, and transmit a prompt tone play command to the play module when the Bluetooth connection state between the Bluetooth headset and the terminal is the disconnected state and the current call state is that a call is present;

the call module is configured to feed back the current call state to the Bluetooth connection detection module; and the play module is configured to read a first preset audio file and play externally the first preset audio file according to the prompt tone play command transmitted by the Bluetooth connection detection module, wherein the first preset audio file stores a prompt tone indicating that the Bluetooth headset has been disconnected;

wherein, the play module is further configured to further read a second preset audio file and transmit the second preset audio file to an opposing side of the call via a voice channel when receiving the prompt tone play command transmitted by the Bluetooth connection detection module, wherein the second preset audio file is an audio file indicating that the Bluetooth headset has been disconnected.

2. The terminal according to claim 1, wherein the play module is configured to read a second preset audio file and transmit the second preset audio file to the opposing side of the call via a voice channel by the following method:

reading the second preset audio file from a physical storage space of the terminal, outputting a corresponding byte stream in the second preset audio file encoded by a codec to the voice channel of the call module, and transmitting the byte stream to the opposing side of the call via a wireless air interface.

3. The terminal according to claim 2, wherein the Bluetooth connection detection module is configured to detect the Bluetooth connection state between the Bluetooth headset and the terminal by the following method:
registering monitoring on a Bluetooth module of the terminal to detect the Bluetooth connection state between the Bluetooth headset and the terminal.

4. The terminal according to claim 1, wherein the play module is configured to read a first preset audio file and play externally the first preset audio file by the following method:
reading the first preset audio file from a physical storage space of the terminal, and controlling the first preset audio file encoded by a codec to be externally played by a speaker.

5. The terminal according to claim 4, wherein the Bluetooth connection detection module is configured to detect the Bluetooth connection state between the Bluetooth headset and the terminal by the following method:
registering monitoring on a Bluetooth module of the terminal to detect the Bluetooth connection state between the Bluetooth headset and the terminal.

6. The terminal according to claim 1, wherein the Bluetooth connection detection module is configured to detect the Bluetooth connection state between the Bluetooth headset and the terminal by the following method:
registering monitoring on a Bluetooth module of the terminal to detect the Bluetooth connection state between the Bluetooth headset and the terminal.

7. A call control method, comprising:
detecting, by a terminal, a Bluetooth connection state between a Bluetooth headset and the terminal, and
when detecting that the Bluetooth connection state between the Bluetooth headset and the terminal is a disconnected state and the terminal determines that a call is currently present, playing externally, by the terminal, a first preset audio file, wherein the first preset audio file stores a prompt tone indicating that the Bluetooth headset has been disconnected;
wherein when detecting that the Bluetooth connection state between the Bluetooth headset and the terminal is the disconnected state and the terminal determines that the call is currently present, the method further comprises:
transmitting, by the terminal, a second preset audio file to an opposing side of the call via a voice channel, wherein the second preset audio file is an audio file indicating that the Bluetooth headset has been disconnected.

8. The method according to claim 7, wherein the step of transmitting, by the terminal, a second preset audio file to the opposing side of the call via a voice channel comprises:
reading, by the terminal, the second preset audio file from a physical storage space of the terminal, outputting a corresponding byte stream in the second preset audio file encoded by a codec to the voice channel of a call module, and transmitting the byte stream to the opposing side of the call via a wireless air interface.

9. The method according to claim 8, wherein the step of detecting, by a terminal, a Bluetooth connection state between a Bluetooth headset and the terminal comprises:
registering, by the terminal, monitoring on a Bluetooth module of the terminal to detect the Bluetooth connection state between the Bluetooth headset and the terminal.

10. The method according to claim 7, wherein the step of playing externally, by the terminal, a first preset audio file comprises:
reading, by the terminal, the first preset audio file from a physical storage space of the terminal, and playing externally the first preset audio file encoded by a codec through a speaker.

11. The method according to claim 10, wherein the step of detecting, by a terminal, a Bluetooth connection state between a Bluetooth headset and the terminal comprises:
registering, by the terminal, monitoring on a Bluetooth module of the terminal to detect the Bluetooth connection state between the Bluetooth headset and the terminal.

12. The method according to claim 7, wherein the step of detecting, by a terminal, a Bluetooth connection state between a Bluetooth headset and the terminal comprises:
registering, by the terminal, monitoring on a Bluetooth module of the terminal to detect the Bluetooth connection state between the Bluetooth headset and the terminal.

* * * * *